(12) United States Patent
Scholte-Wassink et al.

(10) Patent No.: US 8,169,098 B2
(45) Date of Patent: May 1, 2012

(54) WIND TURBINE AND OPERATING SAME

(75) Inventors: Hartmut Scholte-Wassink, Lage (DE);
Anders Wickstroem, Karlstad (SE);
Martin Essing, Neuenkirchen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/976,530

(22) Filed: Dec. 22, 2010

(65) Prior Publication Data

US 2011/0204636 A1 Aug. 25, 2011

(51) Int. Cl.
*F03D 9/00* (2006.01)
*H02P 9/04* (2006.01)

(52) U.S. Cl. .......................................... 290/44; 290/55

(58) Field of Classification Search .................... 290/44, 290/55

See application file for complete search history.

(56) References Cited

U.S. PATENT DOCUMENTS

| | | | | |
|---|---|---|---|---|
| 4,420,692 A * | 12/1983 | Kos et al. | ............ | 290/44 |
| 4,435,647 A * | 3/1984 | Harner et al. | ............ | 290/44 |
| 6,695,588 B1 * | 2/2004 | Nielsen | ............ | 416/244 R |
| 6,891,280 B2 * | 5/2005 | Siegfriedsen | ............ | 290/44 |
| 7,220,104 B2 * | 5/2007 | Zheng et al. | ............ | 416/145 |
| 7,309,930 B2 * | 12/2007 | Suryanarayanan et al. | ............ | 290/55 |
| 7,317,260 B2 * | 1/2008 | Wilson | ............ | 290/44 |
| 7,400,055 B2 * | 7/2008 | Nagao | ............ | 290/44 |
| 7,423,352 B2 * | 9/2008 | Suryanarayanan et al. | ............ | 290/55 |
| 7,692,322 B2 * | 4/2010 | Wakasa et al. | ............ | 290/44 |
| 7,772,713 B2 * | 8/2010 | Huang et al. | ............ | 290/44 |
| 7,919,880 B2 * | 4/2011 | Nielsen et al. | ............ | 290/44 |
| 7,931,438 B2 * | 4/2011 | Schellings | ............ | 416/1 |
| 7,980,814 B2 * | 7/2011 | Nieuwenhuizen | ............ | 415/119 |
| 8,022,566 B2 * | 9/2011 | Loh et al. | ............ | 290/44 |
| 8,044,529 B2 * | 10/2011 | Egedal | ............ | 290/44 |
| 8,093,737 B2 * | 1/2012 | Wittekind et al. | ............ | 290/44 |
| 8,093,742 B2 * | 1/2012 | Gupta et al. | ............ | 290/44 |
| 2003/0151260 A1 * | 8/2003 | Siegfriedsen | ............ | 290/44 |
| 2006/0033338 A1 * | 2/2006 | Wilson | ............ | 290/44 |
| 2006/0066111 A1 * | 3/2006 | Suryanarayanan et al. | ............ | 290/44 |
| 2006/0147306 A1 * | 7/2006 | Zheng et al. | ............ | 416/1 |
| 2007/0110578 A1 * | 5/2007 | Stommel | ............ | 416/132 B |
| 2007/0182162 A1 * | 8/2007 | McClintic | ............ | 290/55 |
| 2008/0145222 A1 * | 6/2008 | Schellings | ............ | 416/31 |
| 2008/0260514 A1 * | 10/2008 | Nielsen et al. | ............ | 415/4.3 |
| 2009/0142178 A1 * | 6/2009 | Nieuwenhuizen | ............ | 415/2.1 |
| 2009/0200804 A1 * | 8/2009 | Nielsen et al. | ............ | 290/44 |
| 2009/0250932 A1 * | 10/2009 | Egedal | ............ | 290/44 |
| 2009/0292397 A1 * | 11/2009 | Bjerge et al. | ............ | 700/280 |
| 2010/0013235 A1 * | 1/2010 | Bjerge et al. | ............ | 290/55 |
| 2010/0045038 A1 * | 2/2010 | Skaare | ............ | 290/44 |
| 2010/0111693 A1 * | 5/2010 | Wilson | ............ | 416/1 |
| 2011/0140420 A1 * | 6/2011 | Loh et al. | ............ | 290/44 |
| 2011/0158751 A1 * | 6/2011 | Ohkubo et al. | ............ | 405/224 |
| 2011/0211951 A1 * | 9/2011 | Kooijman et al. | ............ | 416/1 |
| 2011/0316277 A1 * | 12/2011 | Skaare et al. | ............ | 290/44 |
| 2011/0318165 A1 * | 12/2011 | Oing et al. | ............ | 415/118 |

* cited by examiner

*Primary Examiner* — Pedro J Cuevas
(74) *Attorney, Agent, or Firm* — Global Patent Operation; Douglas D. Zhang (57) ABSTRACT

A method for operating a wind turbine erected in a body of water, comprising: measuring vibrations of the wind turbine during operation; identifying at least one periodic component of said measured vibrations, wherein said periodic component is associated with interaction of said body of water and said wind turbine; and, operating at least one controller of said wind turbine so that water-induced vibrations are reduced.

18 Claims, 7 Drawing Sheets

WIND TURBINE AND OPERATING SAME

BACKGROUND OF THE INVENTION

The subject matter described herein relates generally to methods and systems for operating wind turbines, and more particularly, to methods and systems for reducing vibrations in wind turbines which are erected in a body of water.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

In the past, wind turbines have often be installed onshore allowing for well-known construction methods and also easy accessibility and maintenance. However, availability of onshore sites becomes rare in some countries. Furthermore, environmental impact of onshore wind turbines on residents living near the turbine site impose, e.g., size limitations onto onshore turbines. For these and other reasons, offshore wind turbine sites, i.e. sites which are located in a body of water, are attracting more and more interest during recent years. However, offshore wind turbines encounter specific challenges not experienced with onshore wind turbines that pose technical and logistical problems still to be solved. Some of these problems are related to the interaction between an offshore wind turbine and the body of water surrounding it.

BRIEF DESCRIPTION OF THE INVENTION

In one aspect, a method for operating a wind turbine erected in a body of water is provided. A method for operating a wind turbine erected in a body of water includes measuring vibrations of the wind turbine during operation; identifying at least one periodic component of the measured vibrations, wherein the periodic component is associated with interaction of the body of water and the wind turbine; and, operating at least one controller of the wind turbine so that water-induced vibrations are reduced.

In another aspect, a method of reducing water-induced oscillations in a wind turbine is provided. A method of reducing water-induced oscillations in a wind turbine includes providing at least one mechanical oscillation sensor at a first position of the wind turbine; reading oscillation data from the at least one mechanical oscillation sensor during operation of the wind turbine; determining a water-induced periodic oscillation of the wind turbine; and, controlling a pitch angle, a yaw angle or a generator torque of the wind turbine so that an amplitude of the water-induced periodic oscillation is reduced.

In yet another aspect, a wind turbine is provided. A wind turbine includes a support structure for supporting the wind turbine; a tower mounted to the support structure; a nacelle mounted on top of the tower; a rotor hub mounted to the nacelle, wherein at least two rotor blades are attached to the rotor hub; a pitch drive system allowing adjustment of the individual pitch angles of the at least two rotor blades; at least one sensor for measuring a vibration of the wind turbine; and, a wind turbine control system adapted to receive measurement data from the at least one sensor, and adapted to analyze said measurement data to identify a water-induced vibration pattern, wherein the control system is further adapted of controlling the pitch drive system to adjust at least one pitch angle of at least one rotor blade so that the water-induced vibration pattern vibration is reduced.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that may be erected offshore or nearshore and is adapted to reduce vibrations during operation. More specifically, the wind turbine according to embodiments described herein is adapted to specifically identify and reduce vibrations induced by the interaction of water and the wind turbine.

As used herein, the term "offshore" is intended to be representative of a location within a body of water, e.g. a lake, a river or the sea. As used herein, the term "water" is intended to be representative of salt water, fresh water or a mixture of both as well as of running water and standing water. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
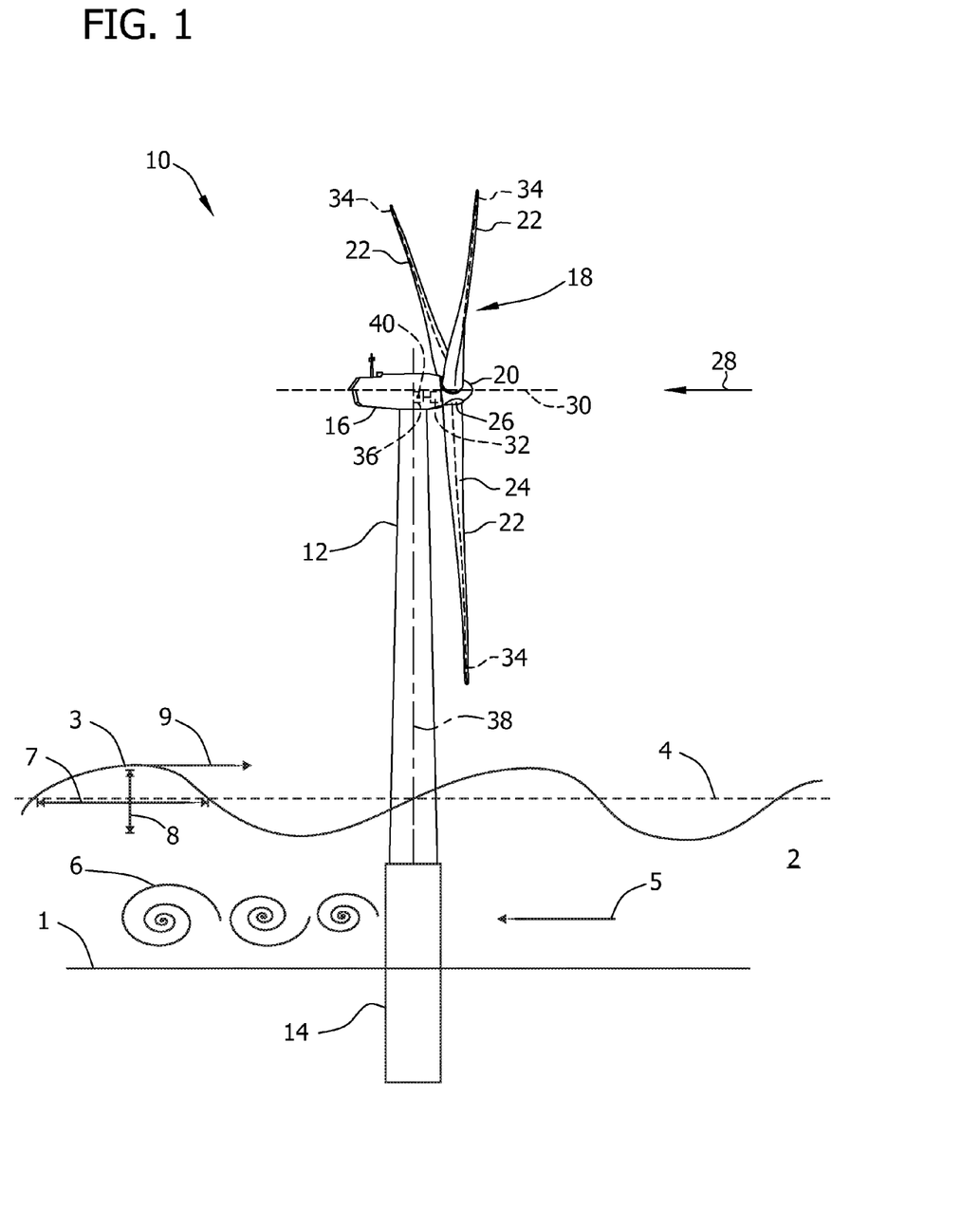
FIG. 1 is a perspective view of an exemplary wind turbine.

FIG. 1 is a perspective view of an exemplary offshore wind turbine 10. In the exemplary embodiment, offshore wind turbine 10 is a horizontal-axis wind turbine. Alternatively, offshore wind turbine 10 may be a vertical-axis wind turbine. In the exemplary embodiment, offshore wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, offshore wind turbine 10 is mounted in a body of water 2, e.g. in a lake or in the sea. The body of water 2 has a ground 1, e.g. e lakebed or a seabed, which typically comprises sand and/or gravel. In the exemplary embodiment, support system 14 is a monopole structure anchored in ground 1. In alternative embodiments, support system 14 may include a tripod structure and/or a lattice structure fixed to ground 1. In a still alternative embodiment, support structure 14 may include a buoyant platform on which tower 12 is mounted. Support structure 14 will be designed such that it provides sufficient support to tower 12, nacelle 16 and rotor 18. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

The body of water 2 has an average water level 4 which may vary with time due to tidal variations in some embodiments. In addition to the tidal variations of the water level, water waves 3 will form at the surface of the body 2 as a result of wind 28 interacting with the water surface. In this context, it is worth noting that the direction 9 ($v_{wave}$) of the water waves is not necessarily the same as the direction 28 ($v_{wind}$) of the wind. For example, due to the topology of ground 1 the direction 9 of the waves 3 may even be opposite to the direction of the wind (as exemplary illustrated in FIG. 1). The correlation between wind speed direction 28 ($v_{wind}$) and wave speed direction 9 ($v_{wave}$) will therefore depend on the specific circumstances of the erection wave, site of the offshore wind turbine 10. In addition, there may exist currents 4 which may or may not vary with time. For example, current 4 may be formed due to the topology of ground 1 and is dependent on the specific circumstances of the erection site.

The waves 3 as well as current 5 will interact with offshore wind turbine 10. Each wave 3 carries a momentum determined by its peak length 7 ($l_{wave}$) and its height 8 ($h_{wave}$), i.e. the volume of water contained in the wave, and its wave, speed of travel 9 ($v_{wave}$). When wave 3 impinges on tower 12, at least a part of the wave momentum will be transferred to tower 12, i.e. onto the offshore wind turbine 10. Typically, water waves 3 are a more or less periodic phenomenon, i.e. not only a single wave is generated but a sequence of waves each having about the same wavelength, wave speed and, therefore, momentum. Accordingly, impinging water waves 3 may be envisioned as a periodic excitation of the tower 12. The interaction between current 5 and the wind turbine 10 is different from the interaction between water waves 3 and the wind turbine 10. Typically, current 5 will cause a phenomenon known as vortex shedding. If an object, e.g. a cylinder, is placed in a laminar flow of a medium, vortices 6 will form behind the structure, detach from it and travel with the flowing medium. These vortices 6 are also known as the von Karman vortex street. The formation and detachment of the vortices is basically periodic. For example, the vortex shedding frequency f of a long cylinder can be approximated by $$f = 0.198 \frac{v_{current}}{d}\left(1 - \frac{19.7}{Re}\right)$$

wherein $v_{current}$ is the velocity of the current, d is the diameter of the cylinder and Re is the Reynolds number if the flow. Due to preservation of angular momentum, the rotational direction of two subsequent vortices will be opposite to each other. Following Newton's third law, each vortex 6 transfers momentum onto the structure upon detaching from the structure. Accordingly, vortex shedding also causes periodic excitation of the wind turbine, in particular of support structure 14 and/or tower 12.

Other than the erratic variations in wind speed, the periodic excitation of offshore wind turbine 10 due to its interaction with the body of water 2 may have undesirable consequences. In particular, the frequency of the water waves 3 and/or the vortex shedding frequency of current 5 may be close to one of the eigenfrequencies of tower 12 and/or support system 14. In this event, tower vibration and/or vibration of the support structure will build up rapidly and may damage these structures or may even have disastrous consequences up to loss of structural integrity.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28. In some embodiments, either control system 36 or an additional generator controller (not shown) may further control electrical generator torque by adjusting rotor and/or stator currents.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
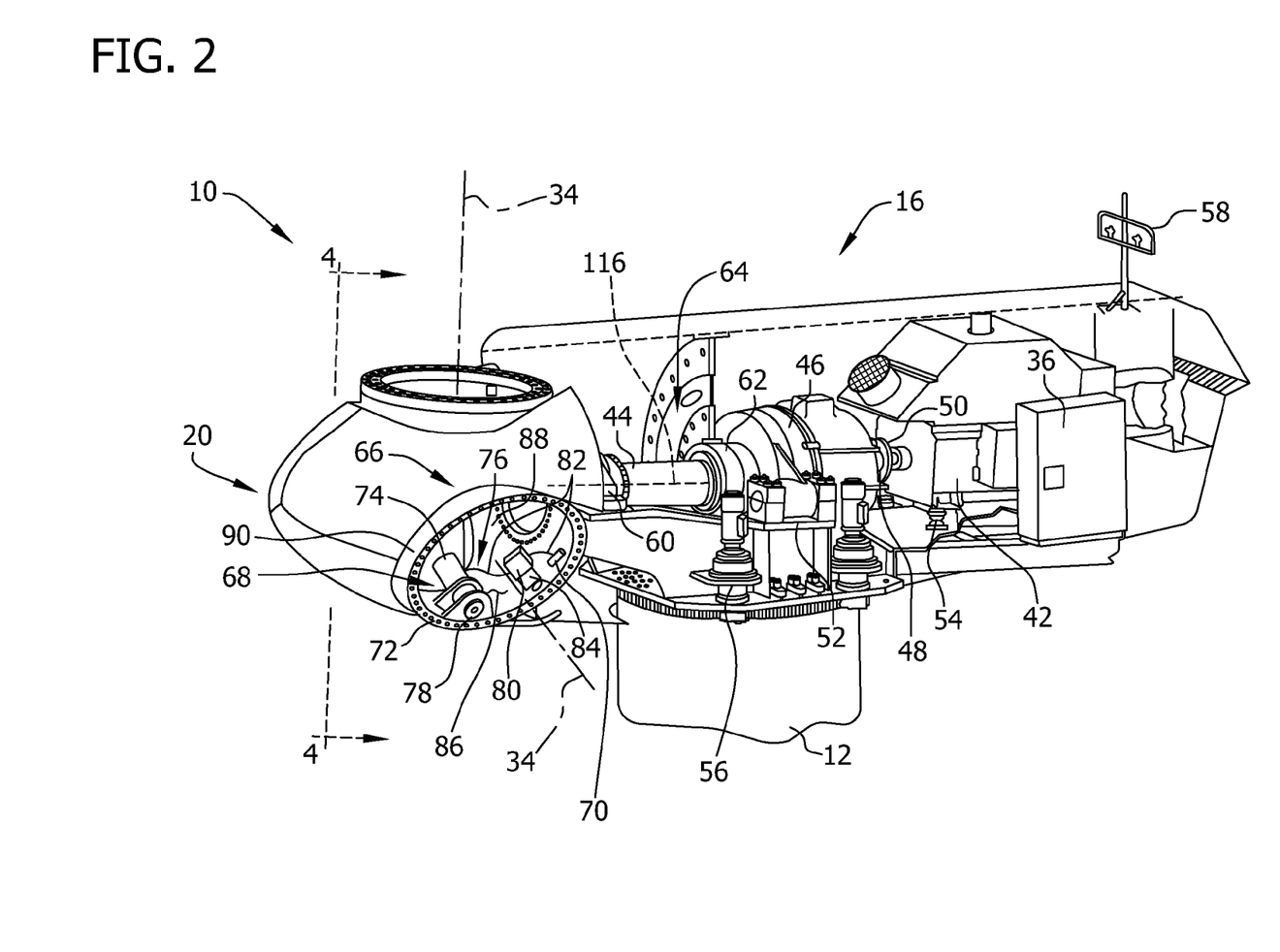
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may, include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Figure 3:
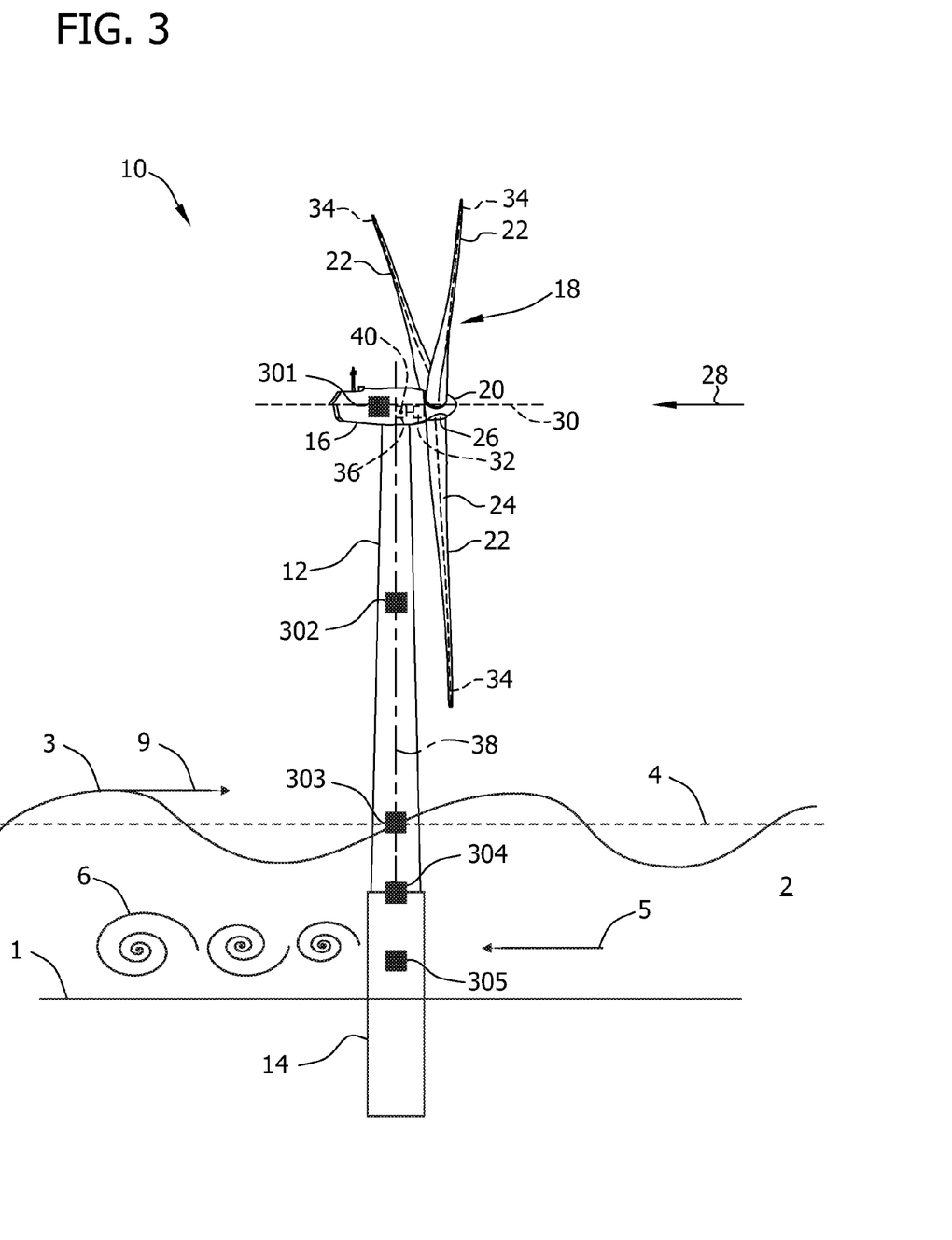
FIG. 3 is a perspective view of a wind turbine according to an embodiment.

Next, an embodiment is described with reference to FIG. 3. Offshore wind turbine 10 shown in FIG. 3 is very similar to the exemplary embodiment described above with regard to FIGS. 1 and 2. However, offshore wind turbine 10 includes several sensors 301, 302, 303, 304, 305. The sensors 301, 302, 303, 304, 305 are adapted to detect vibrations or oscillations of a wind turbine component, e.g. the tower 12 or the nacelle 16. In a non-limiting example, sensors 301, 302, 303, 304, 305 include accelerometers and/or strain gauges. Furthermore, not all sensors are required to be of the same type but it is advantageous to have different types of sensors to enhance redundancy and improve accuracy of the measurement. Furthermore, although the exemplary embodiment of FIG. 3 shows five vibration sensors 301, 302, 303, 304, 305 any desired number of vibration sensors may be applied. For example, only one, two, three or four vibration sensors may be applied but also more than five vibration sensors. Furthermore, each of the sensors 301, 302, 303, 304, 305 may include more than one sensor device. For example, a sensor 301, 302, 303, 304, 305 may include a first and a second strain gauge which are oriented at an angle of about 90 degrees with respect to each other. Thus, the sensor 301, 302, 303, 304, 305 may collect vibrational data for different spatial directions. In another embodiment, a sensor 301, 302, 303, 304, 305 may even include a third strain gauge to obtain vibrational data in a third spatial direction. Furthermore, sensors 301, 302, 303, 304, 305 may include additional sensor devices connected, e.g., in a Wheatstone bridge. Thus, temperature dependency of the sensors may be compensated. Furthermore, each sensor 301, 302, 303, 304, 305 may include redundant sensor devices, e.g. additional strain gauges, in order to ensure failsafe operation thereof.

The sensors 301, 302, 303, 304, 305 may be located at different locations on wind turbine 10. In the non-limiting example shown in FIG. 3, sensor 301 is located in nacelle 16. Thus, sensor 301 may sense fore-aft and/or lateral oscillations of nacelle 16. Furthermore, sensor 302 is located about halfway up the tower 12. Thus, sensor 302 senses tower vibrations at this section of the tower. For example, a base mode of the tower oscillations may have its peak amplitude at this position so that the signal-to-noise-ratio is increased for sensor 302. In other embodiments, sensor 302 may be located at different positions along the longitudinal extension of tower 12. Sensor 303 is located at about the average water level 4. Thus, the position of sensor 303 is beneficial for sensing the impact of incoming waves 3 on tower 12. Sensor 304 is located at the interface between support structure 14 and tower 12. Thus, sensor 304 is adapted for sensing vibrations at this interface between support structure 14 and tower 12. In one embodiment, sensor 304 includes a first sensor mounted to tower 12 and a second sensor adjacent to the first sensor but mounted to support structure 14. Thus, different vibrational behavior may be detected between tower 12 and support structure 14. Such differences in oscillation between adjacently located sensors may be indicative of load stress or even structural damage in the tower/support connection. Finally, sensor 305 is located at the support structure 14 and, thus, adapted to detect the oscillations of support structure 14. These oscillations may be caused, for example, by vortex shedding of an underwater current 5 flowing around support structure 14.

Each sensor 301, 302, 303, 304, 305 measures data indicative of mechanical oscillations or vibrations and transmits these data to one or more control devices, e.g. control system 36. The data transmission from a sensor to the control system may be wire-bound in some embodiments or wireless in other embodiments. When received by the control system 36, the measured data will be analyzed and serve as a basis for controlling the offshore wind turbine as to reduce the influence of the water-induced vibration pattern on the offshore wind turbine. Methods of analyzing the measurement data and controlling the offshore wind turbines are now explained with respect to FIG. 4.

Figure 4:
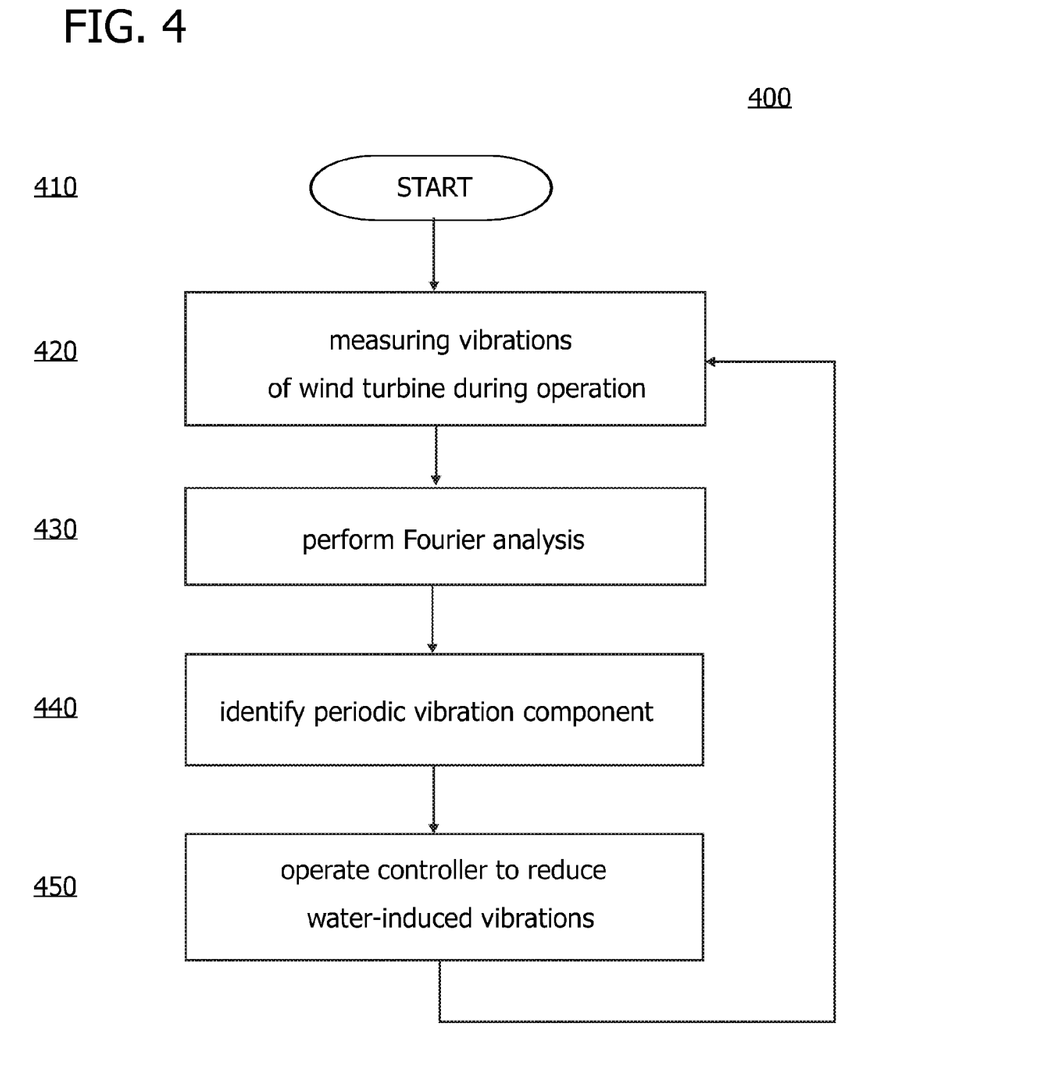
FIG. 4 is a flow diagram of a method according to an embodiment.

A method 400 for operating an offshore wind turbine is started in a first block 410. The method proceeds to block 420 where vibrations of the offshore wind turbine are measured during operation of the turbine. For example, the vibrations may be measured by accelerometers or strain gauges, e.g. sensors 301, 302, 303, 304, 305 as described with reference to FIG. 3. Typically, the measurement will be performed over a predetermined period of time, e.g. measurement intervals of three minutes, five minutes, ten minutes or fifteen minutes, so that a sufficient amount of data for the analysis is collected. Typically, the measurement is performed in the time domain, i.e. the sensor determines the time variation of the measured variable (e.g. acceleration or strain). The measurement data may be collected from a single sensor or from several sensors. Each sensor will provide the vibrational behavior of the wind turbine at a specific location thereof. For example, a sensor located in the nacelle will provide data about nacelle vibrations which may be different from vibration data of a sensor located at the support structure of the wind turbine. Typically, the measured vibration data are collected by the control system which will then further analyze these data.

Figure 5:
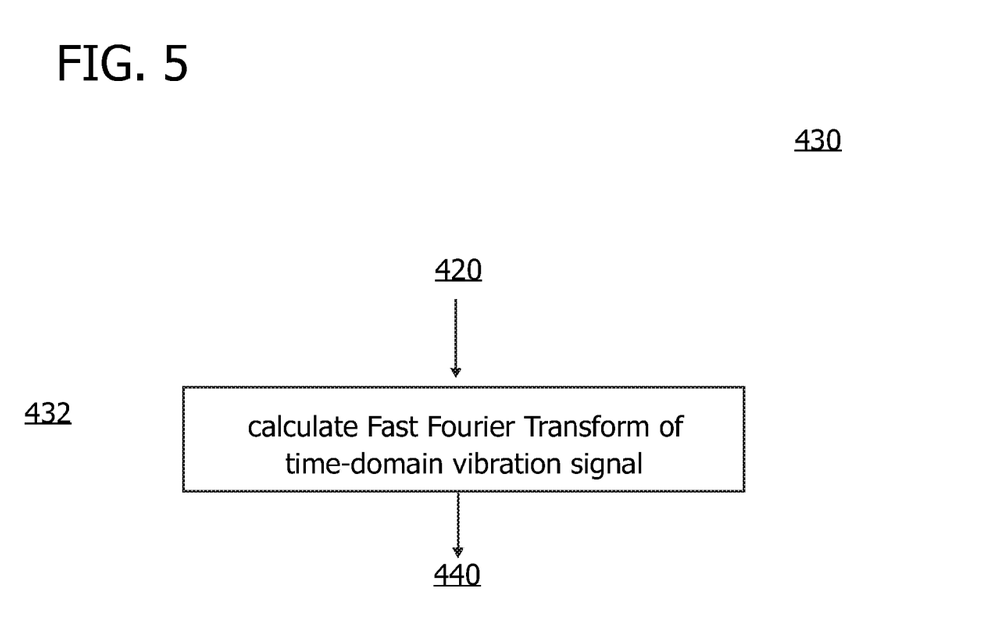
FIG. 5 is a detailed flow diagram of one method block as shown in FIG. 4.

The method moves on to block 430, where a Fourier analysis is performed on the time-domain measurement data. Thus, the frequency spectrum of the mechanical vibrations is obtained. In an exemplary embodiment shown in FIG. 5, the Fourier analysis is performed by calculating the Fast Fourier Transform (FFT) of the time-domain vibration signal in block 432. Since very fast FFT algorithms are available, the application of FFT allows for quick analysis of the measured vibrations and, as a consequence, quick reaction by the control system. If measurement data from several vibration sensors are provided, the individual signals will undergo FFT separately to obtain individual frequency spectra for the vibration sensors.

Figure 6:
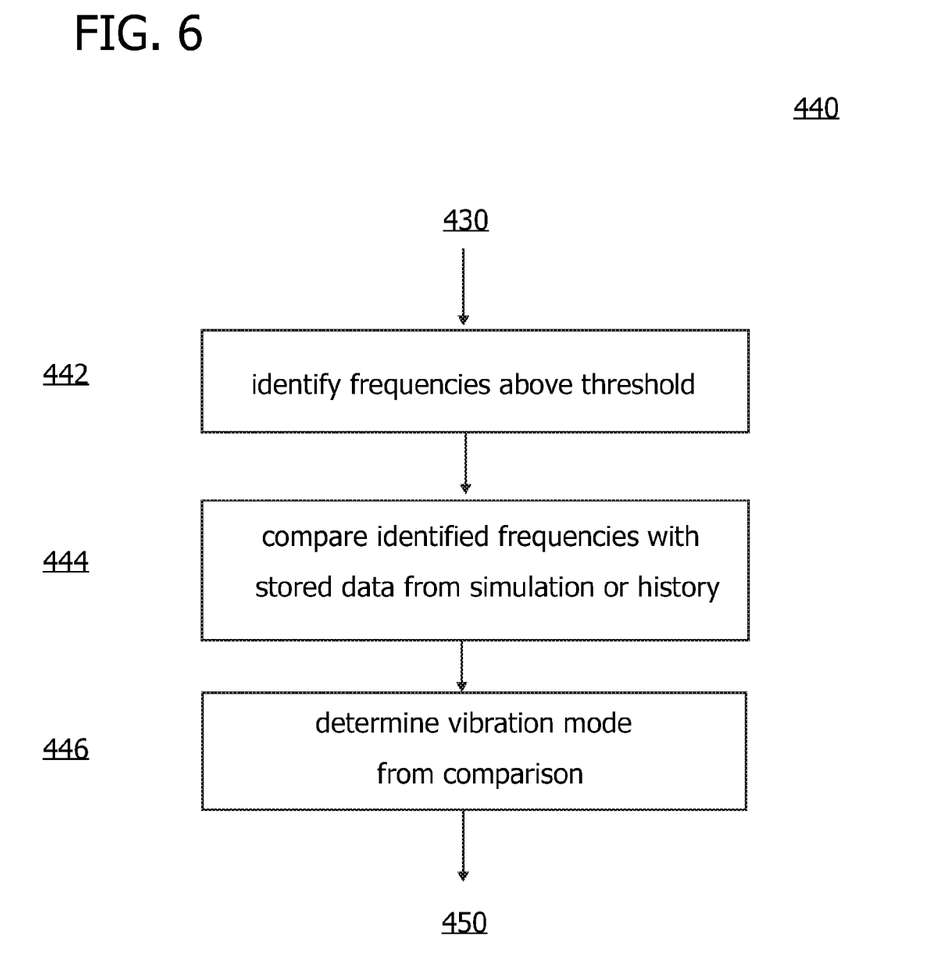
FIG. 6 is a detailed flow diagram of another method block as shown in FIG. 4.

In a next block 440 of the method, a periodic vibration component, typically a water-induced vibration component, is identified. A detailed, non-limiting embodiment of the identification block 440 is shown in FIG. 6. Therein, frequencies having a Fourier coefficient, sometimes also referred to as a weight, above a predetermined threshold are identified in block 442. These frequencies correspond to predominant vibrational modes present in the vibrational pattern of the offshore wind turbine. In next block 444, the identified frequencies will be compared with stored data. The stored data may be based upon simulations and/or historical data and/or empirical relationships. For example, wave and current interaction with the offshore wind turbine at the projected site may be simulated prior to erecting the offshore wind turbine. The results of this simulation may at least be partially stored, e.g. in a memory connected to the control system, prior to operation of said offshore wind turbine. During operation of the wind turbine, the actual measurements may thus be compared to the simulation in order to identify the vibrational modes in block 446. In particular, the measured frequency spectrum and the simulated frequency spectrum may be compared to each other to identify specific vibrational modes of the wind turbine. Additionally or alternatively, the actual measurement data may be compared with historical measurement data in order to identify water-induced vibrational modes. Additionally or alternatively, empirical relationships or correlations may be established, e.g. when using a self-learning algorithm. For example, empirical correlations may be established between wind speed or wind direction and at least one of wave frequency, wave direction, wave height, average wave momentum, average wave power density, current frequency or current flow rate. Also, simulated data may be taken into account or may form the starting point for building the empirical correlations. Thus, the control system may estimate from measured wind speed and wind direction the interaction between water and wind turbine and, also, the vibrational modes excited by this interaction. In one embodiment, identifying the periodic vibrations component also includes identifying a frequency, an incoming direction, a wavelength or a peak height of water waves interacting with the offshore wind turbine. In a further embodiment, these data are independently obtained from a visual system, e.g. a camera, and/or a water-bound measurement system, e.g. a measurement buoy. Comparing the estimate from the vibration analysis and the independent measurement systems may be used to increase accuracy of the estimate.

In a next block 446, the water-induced vibrational mode is identified from the above-described comparison. In one embodiment, the periodic vibration component is identified as a tower eigenfrequency, e.g. a first tower eigenfrequency or second tower eigenfrequency. In another embodiment, the periodic vibration component is identified as a support structure eigenfrequency. In still another embodiment, the periodic vibration component is identified as a vortex shedding frequency of a Karman vortex street of the support structure.

Going back to FIG. 4, after identifying the periodic vibration component the method moves on to block 450. Therein, the control system of the wind turbine is operated in order to counteract, e.g. damp, the water-induced vibrations. Additionally or alternatively, the control system is operated to reduce a lateral motion of a nacelle. Additionally or alternatively, the control system is operated to reduce a vibrational mode of the tower, for example a first eigenfrequency or a second eigenfrequency of the tower. Additionally or alternatively, the control system is operated to reduce a vibrational mode of the support structure. In one embodiment, the operation of the control system is based on the multi-directional characteristics of wind and waves. Alternatively the step of performing Fourier analysis 430 may be omitted yielding an alternate embodiment of a method for operating a wind turbine erected in a body of water, comprising: (a) measuring vibrations of the wind turbine during operation; (b) identifying at least one periodic component of said measured vibrations, wherein said periodic component is associated with interaction of said body of water and said wind turbine; and, (c) operating at least one controller of said wind turbine so that the water-induced vibrations are reduced.

Figure 7:
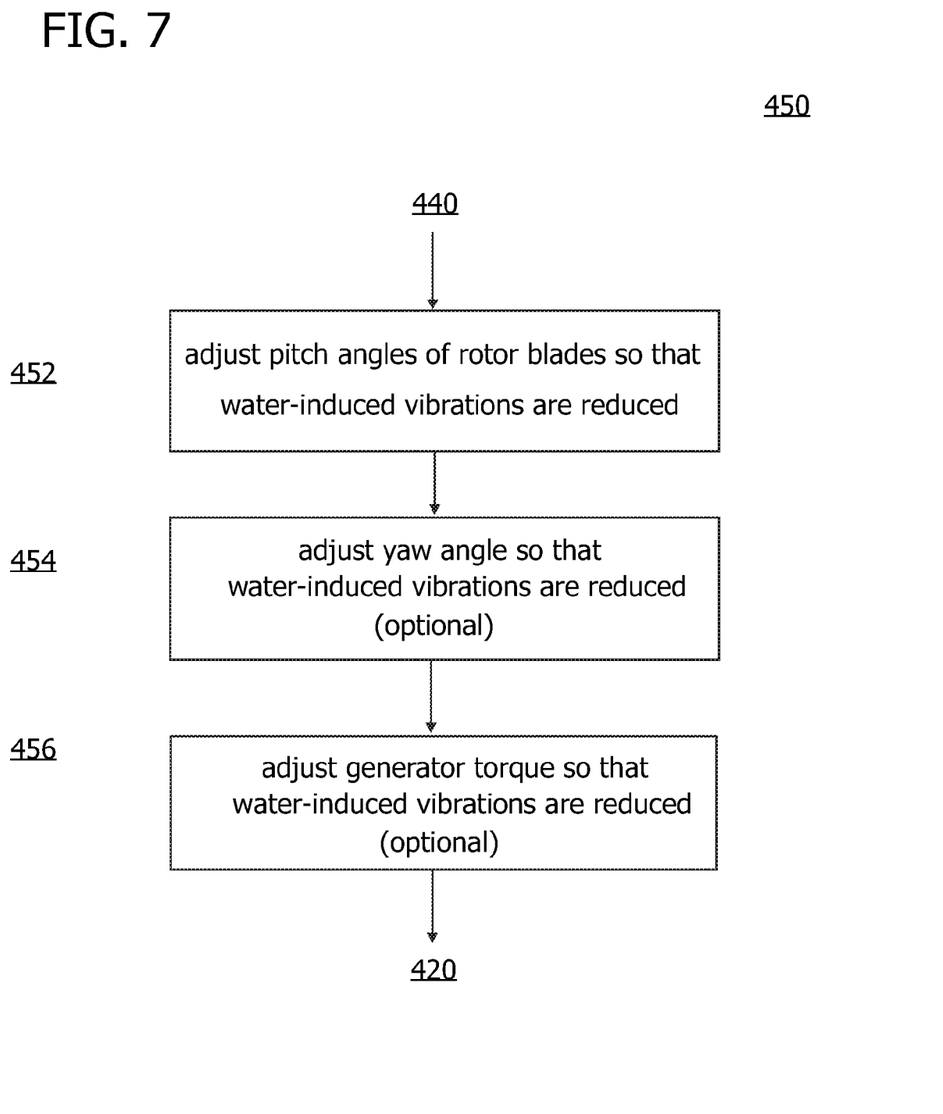
FIG. 7 is a detailed flow diagram of one method block as shown in FIG. 4.

A more detailed flow diagram of one implementation of block 450 is shown in FIG. 7. Therein, the pitch angles of the rotor blades are adjusted in a first block 452. In one embodiment, the pitch angles of two rotor blades are set to different angular values. In another embodiment, the pitch angles of three rotor blades are set to mutually different values. Thus, asymmetric pitching of the rotor blades occurs. By setting the rotor blades to different pitch angles, an unbalance is induced by the wind rotor. This unbalance will typically cause a vibrational or oscillatory reaction of the structural parts of the wind turbine. In some embodiments, the control system is adapted to generate such unbalances in reaction to the identified water-induced vibrations so that the unbalance-induced vibrations reduce, e.g. counteract or damp, the water-induced vibrations. In such embodiments, the control system will use the pitch control system to adjust the pitch angles of the rotor blades so that the water-induced vibrations are reduced.

Additionally or alternatively, the yaw angle of the wind turbine may also be adjusted in order to reduce water-induced vibrations in block 454. During normal operation, the wind rotor is typically facing upwind and the yaw control system is adjusting the yaw angle so as to align the rotor axis and the wind direction. However, misalignment between the rotor axis and the wind direction may cause vibrations or oscillations in the wind turbine. Similar to the vibrations caused by asymmetric pitching, also the yaw-induced vibrations may be used to reduce, e.g. counteract or damp, the water-induced vibrations. In such embodiments, the control system will use the yaw control system to adjust the yaw angle so that the water-induced vibrations are reduced.

Additionally or alternatively, the generator torque of the electric generator may also be adjusted in order to reduce water-induced vibrations. Generator torque can be controlled by adjusting the excitation currents in the generator windings. Adjustment of generator torque may induce vibrations in the wind turbine. Similar to the vibrations caused by asymmetric pitching, also the generator torque-induced vibrations may be used to reduce, e.g. counteract or damp, the water-induced vibrations. In such embodiments, the control system will use the generator control system to adjust the generator torque so that the water-induced vibrations are reduced.

Exemplary embodiments of systems and methods for operating a wind turbine are described above in detail. The systems and methods are not limited to the specific embodiments described herein, but rather, components of the systems and/or steps of the methods may be utilized independently and separately from other components and/or steps described herein. Rather, the exemplary embodiment can be implemented and utilized in connection with many other rotor blade applications. In particular, the methods described herein may be applied in an idling mode of the wind turbine, in a non-idling mode of the wind turbine, and also during a start-up or shut-down phase of the wind turbine. Additionally or alternatively, the methods described herein may be applied in low wind conditions, operating wind conditions, and high wind conditions.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine erected in a body of water, comprising:
   (a) measuring vibrations of the wind turbine during operation;
   (b) identifying at least one periodic component of said measured vibrations, wherein said periodic component is associated with interaction of said body of water and said wind turbine, and wherein identifying the at least one periodic component includes identifying a frequency, an incoming direction, a wavelength or a peak height of water waves interacting with the wind turbine; and
   (c) operating at least one controller of said wind turbine so that the water-induced vibrations are reduced.

2. The method according to claim 1, wherein identifying the at least one periodic component includes performing a Fast Fourier Transform of the measured vibrations.

3. The method according to claim 1, wherein said wind turbine comprises a nacelle and a wind rotor mounted to said nacelle, wherein said nacelle is mounted on a tower which extends from a support structure, and wherein measuring vibrations of the wind turbine during operation comprises measuring a vibration of the nacelle, the wind rotor, the tower or the support structure.

4. The method according to claim 3, wherein the at least one periodic component is a tower eigenfrequency or a support structure eigenfrequency.

5. The method according to claim 3, wherein the at least one periodic component is a vortex shedding frequency of a Karman vortex street of said support structure.

6. The method according to claim 3, wherein the at least one controller is operated to reduce a fore-aft motion of the nacelle of said wind turbine.

7. The method according to claim 1, wherein the at least one controller is a pitch controller and wherein said pitch controller is operated to adjust at least two rotor blades of said wind turbine to different pitch angles for reducing said water-induced vibrations.

8. The method according to claim 1, wherein the at least one controller is a yaw controller and wherein said yaw controller is configured to adjust a yaw angle of said wind turbine for reducing said water-induced vibrations.

9. The method according to claim 1, wherein the at least one controller is a generator controller and wherein said generator controller is configured to adjust electric torque of a generator of said wind turbine for reducing said water induced vibrations.

10. The method according to claim 1, further comprising simulating wave and current interaction with the wind turbine erected in the body of water and storing at least some vibration data from the simulating in said at least one controller prior to operation of the wind turbine.

11. The method according to claim 10, wherein the identifying at least one periodic component further comprises comparing the measured vibrations and the at least some simulated vibration data.

12. The method according to claim 1, further comprising establishing empirical correlations between wind speed or wind direction and at least one of wave frequency, wave direction, wave height, average wave momentum, average wave power density, current frequency or current flow rate, wherein the operation of the at least one controller is based on said empirical correlations.

13. A method of reducing water-induced oscillations in a wind turbine, comprising:
(a) providing at least one mechanical oscillation sensor at a first position of the wind turbine;
(b) reading oscillation data from the at least one mechanical oscillation sensor during operation of the wind turbine;
(c) determining a water-induced periodic oscillation of the wind turbine by determining a frequency, an incoming direction, a wavelength or a peak height of water waves interacting with the wind turbine; and
(d) controlling at least one of a pitch angle, a yaw angle or a generator torque of said wind turbine so that an amplitude of the water-induced periodic oscillation is reduced.

14. The method according to claim 13, wherein the oscillation data read from said mechanical oscillation sensor is compared with simulated or empirical data in order to determine the water-induced periodic oscillation.

15. The method according to claim 14, further comprising measuring actual wind speed and comparing the actual wind speed with simulated or historical wind speed data in order to determine the water-induced periodic oscillation.

16. A wind turbine comprising:
a support structure for supporting the wind turbine;
a tower mounted to the support structure;
a nacelle mounted on top of the tower;
a rotor hub mounted to the nacelle, wherein at least two rotor blades are attached to the rotor hub;
a pitch drive system configured to individually adjust a pitch angle of each of the at least two rotor blades;
a yaw drive system configured to adjust a yaw angle of the wind rotor;
at least one sensor for measuring a vibration of the wind turbine; and,
a wind turbine control system configured to receive measurement data from the at least one sensor, and configured to analyze said measurement data to identify a water-induced vibration pattern, wherein the control system is further configured to control the pitch drive system to adjust at least one pitch angle of at least one rotor blade so that the water-induced vibration pattern is reduced, and to control the yaw drive system to adjust the yaw angle of the wind turbine so that the water-induced vibration pattern is reduced.

17. The wind turbine according to claim 16, wherein the at least one sensor is an accelerometer or a strain gauge.

18. The wind turbine according to claim 16, wherein the at least one sensor is positioned at the support structure, the nacelle, the tower, the interface between the support structure and the tower or at an average water level.

\* \* \* \* \*